Patented Nov. 10, 1953

2,658,869

UNITED STATES PATENT OFFICE 2,658,869

GREASE COMPOSITIONS

Fred H. Stross and Stanley T. Abrams, Berkeley, and Walter H. Peterson, Richmond, Calif., assignors to Shell Development Company, San Francisco, Calif., a corporation of Delaware No Drawing. Application June 24, 1950,
Serial No. 170,248

8 Claims. (Cl. 252—28)

This invention relates to grease compositions. More particularly, it is directed to grease compositions gelled with inorganic colloids and showing improved operating characteristics.

Greases generally comprise a lubricating oil containing a gelling agent. Heretofore, the principal gelling agents employed have been soaps such as sodium stearate or lithium-12-hydroxystearate. In an effort to overcome certain inherent disadvantages of soap greases, oleogels having grease structures have been prepared with inorganic colloids. These latter agents are, for the most part, colloidal oxides, hydroxides and silicates of either natural origin or synthetic preparation. Greases prepared with these inorganic gelling agents exhibit extremely high melting points or appear to have no melting point at all below the decomposition temperature or distillation range of the lubricating oil.

Some of these specific agents employed by the prior art in the preparation of such greases include magnesia, silica and to a very limited extent clay-like substances such as Wyoming bentonite. While these materials form structures resembling greases, each of them results in compositions inherently possessing certain disadvantages. For example, when silica is used as the sole grease-forming colloid, the grease prepared therefrom exhibits "dynamic corrosion." By this term is meant the type of corrosion which occurs when the grease is being actively used, such as in a wheel-bearing with access of water, rather than during storage. Various attempts have been made to overcome this property, such as the addition of water repelling agents, extreme pressure agents or anti-corrosion agents. None of them, however, have been sufficiently effective to permit production of a grease which may be commercially used. In addition to this major defect, greases gelled solely with silica exhibit age hardening.

Another colloidal gel which has been used for grease formation is magnesia. In this case, although the grease prepared therefrom appears to have excellent homogeneity as demonstrated by its high transparency, there is a critical disadvantage exhibited when water is permitted to come in contact with the grease. After a short period of initial resistance to action by water, the grease becomes fluid and eventually disintegrates, especially if hot water is used. This sensitivity to the presence of water is exhibited even though water repelling agents such as stearic acid form a part of the grease composition.

Wyoming bentonites have also been introduced in the form of an "aliphatic-ammonium bentonite complex" for use as a grease-forming agent. This term, which is described more fully hereinafter, refers to the ion-exchange product formed between bentonite and a quaternary ammonium base or salt to give an oleophilic clay capable of forming a grease-like structure with a lubricating oil. While this grease does not exhibit dynamic corrosion to a very serious extent, it possesses the inherent disadvantage of emulsifying to a high degree when mixed with water. Moreover, greases of this kind show evidence of age hardening.

It is an object of the present invention to produce greases having improved properties. It is another object of the present invention to produce greases showing no dynamic corrosion characteristics. It is a further object of the present invention to produce greases exhibiting greatly reduced emulsification characteristics. It is a more specific object of this invention to produce greases gelled with inorganic colloidal gelling agents which exhibit improved lubricating properties, low emulsification values, substantially no dynamic corrosion and high resistance to the action of water.

Now in accordance with the present invention, it has been found possible to produce greases and other thickened lubricants having the above combination of characteristics by the use of amorphous inorganic gelling agents containing a polyvalent metal and silicon, the gelling agent having a critical concentration of the polyvalent metal between 2% and 25% by weight of the inorganic constituents of the gelling agent, the gelling agent bearing from about 5% to about 70%, based on the weight of the gel, of a hydrophobic surface-active agent. In its preferred form, the present invention comprises the use as gelling agent for lubricating oils of magnesium silicates or complex mixtures thereof with oxides and hydroxides.

The amorphous gelling agents include silicates, oxides, hydroxides, synthetic zeolites, mixed silicate-silica gels, and mixed silicate-hydroxide gels, as well as complex mixtures of these various types.

The alkaline earth metals present in each of these classes of gelling agents include magnesium, calcium, strontium, barium and beryllium. Magnesium has been found to give the most favorable effects, while calcium also promotes the best qualities in a grease. While the critical limits have been set at between 2% and 25% based on the weight of the inorganic gel components of an alkaline earth metal, it is preferred that the latter be present in an amount between 3% and 20%. Amorphous gels such as those described hereinafter possess optimum properties as grease-forming agents when they contain between 3% and 20% by weight of the alkaline earth metal.

It will be understood that the colloidal substances with which this invention is concerned are not subject to exact description regarding the presence or absence of silicate or hydroxide. In this respect, it is not possible to determine with accuracy whether magnesium silicate, for example, comprises a mixture of magnesium hydroxide together with silica or whether an actual silicate structure is formed. However, in accordance with the most accepted authorities, it appears probable that gels may be prepared having "pure" silicate structures such as magnesium silicate, calcium silicate and barium silicate. These are most easily prepared by the addition of an alkaline earth metal salt to sodium silicate solution in an amount sufficient to form the stoichiometric compound. Mixtures of silicates with silica having a reduced but sufficient amount of the alkaline earth metal present may be prepared by the addition of an alkaline earth metal salt to sodium or potassium silicate solution, the silicate being present in an excess over the amount required to form the alkaline earth metal silicate. Preferably, acid such as sulfuric acid is then added to this mixture to cause gelation of the colloid at a pH between about 6.5 and 8.5; hence, mixtures of magnesium silicate, calcium silicate or barium silicate with silica may be prepared.

The alkaline earth metal salts useful for the preparation of the subject gels include especially the water soluble sulfates, chlorides or nitrates of the metal. Typical members include calcium chloride and magnesium nitrate. Another class of inorganic gelling agents useful for the production of the present composition are the synthetic zeolites which comprise aluminum silicates bearing exchangeable alkaline earth metal ions. A typical preparation of such zeolites comprises the formation of aluminum silicate by reaction of sodium aluminate and sodium silicate followed by steeping the resulting gel in an alkaline earth metal salt such as magnesium chloride. The complex silicates which result from this type of preparation may be expressed by the general formula:

$$aMO \cdot bAl_2O_3 \cdot cSiO_2 \cdot dH_2O$$

wherein M is an alkaline earth metal and $a$, $b$, $c$ and $d$ are whole numbers such that various ratios of the three different oxides may be present. Preferably, the synthetic zeolites contain an alumina-to-silica molar ratio between 1 to 3 and 1 to 4. Also, it is preferable that the alkaline earth metal oxide and silica be present in the zeolites in a molar ratio between 0.5 to 4 and 2 to 4. Typical zeolites meeting the above requirements include the following structures:

$MgO \cdot Al_2O_3 \cdot 4SiO_2$
$MgO \cdot 2Al_2O_2 \cdot 5SiO_2$ (see Example II)
$2CaO \cdot Al_2O_3 \cdot 3SiO_2$ (see Example I)

The above materials are dispersed in colloidal gel form in lubricating oils for the preparation of the present greases. While mineral lubricating oils are suitable for use in more instances, synthetic lubricants may be used in place of or in addition to mineral lubricating oil. The list which follows gives typical species of the varieties which may be employed. Generally, these include oxyalkylene polymers, silicone fluids, organic phosphates, polymerized olefins and esters of dicarboxylic acids.

*Lubricating oils*

Mineral lubricating oil, preferably. Viscosity of 300–350 SSU at 100° F.
Propylene oxide polymers having average molecular weights of 200 to 1500
Ethylene oxide-propylene oxide copolymers
Trimethylene glycol polymers
Ethylene glycol-trimethylene glycol copolymers
Silicone fluids
Tricresyl phosphate
Trioctyl phosphate
Diphenylcresyl phosphate
Diphenyloctyl phosphate
Di(2-ethylhexyl) sebacate
Dioctyl caprylate
Polymerized olefins
Di(3-methylhexyl) adipate
Polyvinyl caprylate In order to promote the maximum stability toward the action of water, it is preferable to include in these grease compositions a water-repelling agent in an amount between about 5% and 70% based on the weight of the inorganic gelling agent. In the case of most of the amorphous gelling agents, the water-repelling agents appear to be adsorbed on the surface of the gel.

Typical cationic hydrophobic agents suitable for water proofing these amorphous gels are the salts of primary or secondary high molecular weight amines. Preferably, these are salts of hydrohalide acids such as hydrochloric acid or water-soluble carboxylic acids such as acetic acid, and the amines contain at least one aliphatic radical having from twelve to twenty-four carbon atoms. Other water-soluble acids may be used to form the salts, such as hydrobromic acid, propionic acid and lactic acid. The cationic materials need not be completely water-soluble for application to the silicate hydrosols. They are, in fact, for the most part, water-dispersible rather than water-soluble. This is particularly true when two or more of the alkyl radicals have twelve or more carbon atoms or when the amines are polymeric in nature such as in the case of acrolein ammonia condensation products. Acrolein-ammonia condensation products such as those just referred to have molecular weights between about 100 and 350 and a general structure as follows:

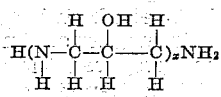

wherein $x$ is an integer sufficient to provide a molecular weight within the recited range. Any of the hydrogen atoms on either the carbon or nitrogen atoms may be replaced with hydrocarbon radicals preferably having from one to six carbon atoms. The following list of cationic surface-active agents gives typical species which may be employed for providing the recited silicates with hydrophobic surfaces:

Cationic surface-active hydrophobing agents

A. Quaternary ammonium salts:
  Trimethyldodecylammonium chloride
  Trimethyltetradecylammonium chloride
  Triethylhexadecylammonium chloride
  Trimethyloctadecylammonium bromide
  Dimethyldihexadecylammonium chloride
  Dimethylcetyllaurylammonium chloride
  Dimethyllaurylstearylammonium chloride
  Diethyldioleylammonium chloride
  Dimethyldiheptadecylammonium chloride
  Dimethyloctadecyloctadecenylammonium chloride B. Amine salts of inorganic acids:
  Tetradecylamine hydrochloride
  Octadecylamine hydrobromide
  Octadecenylamine hydrochloride
  Methyloctadecylamine hydrochloride
  Ethylhexadecylamine hydrobromide
  Dioctadecylamine hydrochloride
  Octadecylheptadecylamine hydrobromide
  Dihexadecylamine hydrochloride
  Ditetradecylamine hydrobromide
  Octyloctadecylamine hydrochloride C. Amine salts of organic acids:
  Octadecylammonium acetate
  Heptadecylammonium propionate
  Hexadecylammonium acetate
  Dioctadecylammonium acetate
  Octadecenylammonium acetate
  Heptadecylammonium acetate
  12-hydroxystearylammonium acetate
  10-ketolaurylammonium acetate
  Oleic acid salt of 2-heptadecylimidazoline D. Miscellaneous amino compounds:
  Acrolein-ammonia condensation products
  Diallylamine-H₂S condensation products
  Epichlorohydrin - ammonia condensation products The class of materials exemplified by the epichlorohydrin-ammonia condensation product is fully described in a copending application to Walter H. Peterson, Serial No. 133,962, filed December 19, 1949 now Patent No. 2,623,852 dated December 30, 1952. Agents typified by the diallylamine-hydrogen sulfide condensation products are described in U. S. Patent 2,517,564. The class including acrolein-ammonia condensation products are disclosed in U. S. Patent 2,520,720.

While the use of cationic surface-active agents is especially preferred, when amorphous gels are considered, other types of water-repelling agents may be used. These include anionic water-repelling agents, agents having a bi-functional characteristic and nonionic surface-active agents.

When zeolites enter into an ion-exchange reaction with cationic materials, the ions remaining appear to be replacing either hydrogen or alkali metal ions which were originally present. For want of a better term, the resulting product may be referred to as "an ammonium complex." These complexes are distinguished from the gels upon which the water-repelling agents are merely adsorbed but the resulting water-repelling action in both cases is nearly identical.

Anionic surface-active agents useful in the present greases are especially organic acids having a high molecular weight. Suitable acids for use in the present compositions include especially the higher fatty acids which may be either saturated or unsaturated such as stearic acid, oleic acid, or linoleic acid. While the fatty acid should contain a lipophilic hydrocarbon radical having at least 10 carbon atoms, those having at least 14 carbon atoms are preferred. Suitable organic acids also comprise phosphonic and phosphinic acids, including monohydrocarbonphosphinic acids, di-hydrocarbonphosphinic acids and the hydrocarbonphosphonic acids. Preferably each of these classes of oxy-phosphorus-containing acids bearing a lipophilic hydrocarbon radical having from 10 to 24 carbon atoms. This radical may be a saturated or unsaturated aliphatic radical or may be cycloalkyl, aryl, alkaryl or aralkyl. Typical and suitable species of these groups include tetradecane-1-phosphinic acid, 3,5-diisobutyl benzene-phosphinic acid, methylhexadecane-1-phosphinic acid, dodecane-1-phosphonic acid, 10-phenyl-decane-1-phosphonic acid, and 2,4-diamylcyclohexanephosphonic acid. Dicarboxylic acids such as alkylated succinic acid also are suitable, including both alkyl and alkenyl succinic acid. A particularly useful member of this series is octadecenyl succinic acid.

Amino acids have been found to be especially useful since they contain two functional groups found to have water-proofing action in the present compositions. The amino fatty acids, such as, for example 12-aminostearic acid, and N-dodecyl-beta-alanine are particularly effective. Sulfonic acids containing lipophilic hydrocarbon groups also may be employed. The preferred species of these include especially the mahogany and the green acids which are formed in the treatment of lubricating oil with concentrated sulfuric acid and other commercial sulfonic acids such as Turkey red oil. Special products of this class which may be employed are the sulfonated polyalkyl naphthalenes such as polyamyl naphthalene sulfonic acid. Naphthenic acids also are suitable and comprise especially the naphthenic acids derived from petroleum sources. The chlorination, sulfurization or phosphorization of any of the above types of acids does not appear to materially affect their waterproofing actions in the grease compositions but simultaneously imparts thereto the extreme pressure property characteristic of these materials which have been described elsewhere.

Compounds containing hydroxy radicals and having at least 10 carbon atoms per molecule also improve the water resistance of the subject greases. The principal classes useful for protecting the greases described hereinafter are especially hydroxy fatty acids, monohydric alcohol, esters of said acids, polyhydric alcohols, esters of glycols and glycerols with hydroxy fatty acids, and fatty acids if the polyhydric alcohol is only partially esterfied, and natural products or modified natural products containing these types of compounds. It will be understood that other specialized groups of compounds meet the limitations given in the statement with the invention, but that these groups are preferred due to their availability and effectiveness.

The test by A. W. Ralston, "Fatty Acids and Their Derivatives," John Wiley & Sons, Inc., 1948, describes the more important types of hydroxy fatty acids and their esters which have been found to be useful in the present invention. The preferred hydroxy fatty acids useful for increasing the water resistance of silica greases and the like include especially hydroxy stearic acids, and, more particularly, 12-hydroxy stearic acid. Other homologs have been found to be effective as well such as stearic acids having hydroxy substituents in the 9, 10 or 11 positions.

Polyhydroxy compounds also are effective, such as 9,10-dihydroxy stearic acid, 3,12-dihydroxy palmitic acid or 9,10,16-trihydroxy palmitic acid. While the saturated acids are preferred, those containing olefinic or acetylenic linkages may be used if available. These include such acids as 12-hydroxy ricinoleic acid, 19-hydroxy nonadecanoic acid and wool wax acids.

The hydroxy fatty acid glycerides which may be used in accordance with this invention are preferably the glycerides of fatty acids containing 10 or more carbon atoms and 1 or more hydroxyl radicals which are separated from the carboxyl group by at least one carbon atom. The preferred form of the material, due to availability and cost, is hydrogenated castor oil. Other glycerides of hydroxy fatty acids are effective for the present purpose such as glycerides of the hydroxy fatty acids produced by catalytic oxidation of hydrocarbon oils and waxes which have been extracted and fractionated to a desirable molecular weight range.

Partial esters of polyhydric alcohols and partial ethers of polyhydric alcohols are effective water-proofing agents for use in the present compositions. The preferred type of esters falling within this class include mono-esters of glycerol wherein the ester radical contains at least 10 carbon atoms. A typical member of this class is gylcerol mono-stearate. Ethers of glycerol containing 10 or more carbon atoms in the ether radical are exemplified by the monodecyl ether of glycerol.

The esters of monohydric alcohols with hydroxy fatty acids have been found to be effective water-proofing agents. Preferably, the esters are formed from alcohols having from 4 to 16 carbon atoms such as butyl, octyl and dodecyl alcohols together with hydroxy fatty acids such as those described above. A particularly effective member of this series is the butyl ester of 12-hydroxy stearic acid.

Glycols having at least 10 carbon atoms in the molecule also are suitable. Specific members of this class include 1,4-dodecane diol, 1,2-decane diol and 1,10-decane diol. It is a preferred practice to apply glycols having widely spaced hydroxyl groups since it has been noted that glycols having hydroxyl groups attached to adjacent carbon atoms soften the grease to a certain extent, but glycols having widely spaced hydroxyl groups do not affect the grease in this manner. The lower polymers of alkylene glycols such as polyethylene glycol and polymethylene glycol are suitable water-proofing agents. The molecular weight of these polymers should be at least about 200 and preferably not more than about 800. Polyalkylene glycols having one of the end hydroxyl groups in the form of an ether or ester may be used as well. A typical member of this class is the monobutyl ether of tetraethylene glycol.

Higher molecular weight monohydric alcohols may be used such as decyl, dodecyl, stearyl and similar aliphatic monohydric alcohols. As was noted above, the corresponding mercapto compounds are effective for the present purpose and include especially higher molecular weight mercaptans such as dodecyl mercaptan.

Still another type of water-repelling agent useful in the present compositions comprises the polyvalent metal salts of high molecular weight organic acids.

The hydrophobic polyvalent metal salts of organic acids which may be used in the present compositions include as a preferred group the amphoteric metal salts, and especially the aluminum salts of the higher fatty acids. Other amphoteric metals forming suitable salts include lead, tin, zinc, etc. The salts of other polyvalent metals are useful, such as those of copper, cobalt, manganese, calcium and barium.

The acids from which such salts may be prepared include especially the higher fatty acids, i. e., acids that have at least twelve carbon atoms in the molecule; naphthenic acids such as may be obtained by extraction of petroleum distillates with alkaline solutions; acids obtained by the saponification of animal, plant or fish fats and oils; rosin acids, tall oil acids, aromatic acids having aliphatic side chains, acids obtained by the oxidation of hydrocarbons such as wax, wool fat acids, etc. Especially effective species include aluminum stearate, lead stearate, the aluminum salt of 12-hydroxystearic acid, calcium naphthenate, lead naphthenate, mercuric acetate-naphthenate, iron oleate, aluminum oleate, lead sulfonate.

The compositions of the present invention should contain a major amount of lubricating oil, preferably greater than 80% by weight of the composition and still more preferably between 85% and 95% thereof. The inorganic gelling agent containing both magnesium and silicon should be present in an amount between about 2% and 30% based on the weight of the grease and including only the inorganic constituents of the gelling agent. Preferably, the agent is present in an amount between 3% and 15% while optimum results are obtained when 4-10% of the grease comprises the gelling agent. The surface-active water-repelling agents, whether present as such or in the form of bound radicals present on the surface of the gel, should comprise from 5% to 70% by weight based on the latter and preferably 30-65%. Summarizing the above constituents, a preferred grease composition will comprise the following ingredients:

Colloidal gelling agent____ 3-15% based on the weight of the composition.
Water-repelling agents__ 30-65% based on the weight of the gelling agent.
Lubricating oil_____ At least 80% by weight of the grease.

The general process for the preparation of these greases comprises dispersion of the agent in the lubricating oil followed by milling to produce a grease structure. A number of processes are available to create the proper type of dispersion. The earliest known variety comprises producing a hydrogel of the colloid, replacing water with a water-miscible solvent such as alcohol or acetone, displacing the latter with an oil-soluble solvent such as pentane, adding the resulting organogel to lubricating oil and subsequently removing the oil soluble solvent. The resulting oleogel may then be milled to produce a grease structure.

An alternative process for the preparation of these greases comprises the formation of aerogels which are subsequently dispersed in a lubricating oil. According to this particular process, a hydrogel is initially formed from which water is displaced with low boiling liquids, after which the organogel is placed in an autoclave and heated above the critical temperature of the liquid which is present. When the liquid is flashed off, above the latter temperature, the resulting dry gel remains in a highly expanded state substantially as it was originally formed, as opposed to the xerogel structure which results if gels are dried below the critical temperature of the liquid present.

A more practical process for the preparation of these lubricants comprises the "direct-transfer" technique entailing the following steps:

A hydrogel is formed to which is added a water-repelling agent such as an amine, after which the mixture is stirred with lubricating oil under conditions which permit the removal of water such as by heat, vacuum or both. Under these conditions the resulting anhydrous gel is preferentially wet by the lubricating oil, thus avoiding the expensive steps of solvent-displacement or of aerogel formation. The resulting greases are not only highly water-proof, but appear to have substantially the same yield as greases prepared by either of the two preceding methods. Generally, preferred hydrogels contain 1.5 to 4% colloid and optimum washing characteristics and grease yield occur when the colloid concentration in water is 2.3 to 2.8%.

Still a fourth method for the preparation of the subject greases depends upon the water-repelling action which follows the complex formation occurring between cationic surface-active agents and the zeolitic colloids. The resulting "aminogel" even though it is in aqueous form may be added directly to lubricating oil and water subsequently removed. Alternatively, the aminogel may be dried prior to incorporation in lubricating oil. Finally, the greases may be prepared by the forming of several greases and subsequently mixing them in desired proportions.

While the compositions described hereinbefore overcome the previous disadvantages of dynamic corrosion and excessive emulsification, they may be still further improved by treatment with certain types of acids providing the water-repelling agent employed is a cationic surface-active agent. This treatment is fully described in a copending application of applicants', Ser. No. 170,480 filed June 26, 1950, now Patent No. 2,626,899 dated January 27, 1953. The agents especially suitable for this purpose include phosphorus-, sulfur- and silica - containing oxy-acids. The preferred agents are phosphoric acid and sulfuric acid.

It will be understood by experts in the art that these grease compositions may contain other well-known lubricant and grease additives. These include extreme pressure agents, antioxidants, anticorrosion agents, viscosity index improvers and the like. The examples which follow describe the preparation of greases containing the critically defined amounts of alkaline earth metal inorganic gels or ammonium complexes together with the properties of the resulting greases.

EXAMPLE I

*Calcium zeolite grease*

Sodium zeolite was prepared by adding as quickly as possible 1845 cc. of sodium silicate solution diluted to 1.4 N-hydroxide to 3500 cc. of 0.79 N-sodium aluminate. The gel set in about five seconds. It was then aged for three days. Following aging, it was washed with 80 liters of distilled water over a period of eighteen days. The yield of hydrogel was 4623 grams of which 3723 grams were slurried with four liters of distilled water.

The calcium zeolite was prepared by treatment of this slurry with an equal volume of 0.5 M calcium chloride solution. After standing for about one hour, the gel was filtered and washed with 26 liters of water over a period of four days. The resulting calcium zeolite was dehydrated by displacement of water with isopropyl alcohol. The resulting alcogel was added to mineral lubricating oil containing 2% by weight of aluminum stearate. This mixture was heated to 140° C. to drive off the alcohol. The oleogel was then milled to produce a grease containing 7.5% by weight of the calcium zeolite. It was highly water-resistant and work-stable. The calcium zeolite contained 10.4% calcium oxide, 27% aluminum oxide and 62.2% silica on a dry basis.

EXAMPLE II

*Barium zeolite grease*

The procedure described above was followed with the exception that barius chloride was employed in place of calcium chloride. Moreover, stearic acid was added in 2% concentration to the lubricating oil instead of aluminum stearate. The resulting grease was also found to be water-resistant and work-stable. The inorganic portion comprised 27% barium oxide, 21.8% alumina and 49.8% silica.

EXAMPLE III

*Magnesium silicate-silica greases*

A gel was prepared by adding 1 mol magnesium chloride to potassium silicate solution. The resulting mixture was acidified to pH 7.4 by the addition of sulfuric acid. The resulting gel was washed free of chloride and sulfate ions and incorporated in mineral lubricating oil by the "direct transfer" technique described hereinbefore using 40% by weight of the gel of an epichlorohydrin-ammonia condensation product as a water-repelling agent. The resulting grease contained 8.5% solids. No dynamic corrosion was found when using this grease while, at the same time, it exhibited excellent lubricating characteristics. The grease had satisfactory emulsification characteristics. The gel used in this grease contained 6% magnesia based on the weight of the inorganic gel.

EXAMPLE IV

*Magnesium silicate-silica*

A similar grease to that of Example III was prepared but using 2-heptadecylimidazoline oleic acid salt as the water-repelling agent. The resulting grease contained 10.5% solids. The characteristics of the grease were similar to those described in Example III.

EXAMPLE V

*Calcium silicate grease*

Calcium chloride solution was added with stirring to sodium silicate solution in sufficient amount to form a gel consisting essentially of calcium silicate. The gel was washed with water to remove chloride ions and then incorporated in mineral lubricating oil by the "direct transfer" technique process using diamethyldicetylammonium chloride. The grease so formed contained approximately 10% solids, and the calcium silicate was water-proofed with approximately 60% by weight of the organic-substituted ammonium radicals. The resulting grease showed no evidence of dynamic corrosion, exhibited excellent lubricating properties and a low tendency to emulsify with water.

While all of the remarks set forth hereinbefore have been directed exclusively to greases comprising gels having a critical content of an alkaline earth metal compound, this only expresses the more preferred form of the present invention. The benefit gained by the presence of the alkaline earth metal compounds appears to be based upon the influence of the latter when the grease is in contact with water. In fact, it has been determined that other buffering agents than the alkaline earth metal compounds result in the same protection against "dynamic corrosion" as is gained by the use of the preferred alkaline earth metal derivatives. The buffers to be used in addition to or in place of the alkaline earth metal compounds should be such to cause water in contact with the grease to have a pH above 8 and preferably above 9. It will be understood that these buffering agents may, therefore, be (in addition to alkaline earth metal compounds) compounds of other metallic elements preferably of polyvalent metals such as aluminum, antimony, arsenic, tin, chromium, titanium, zinc and iron.

The form of addition of these buffering agents should be such as to permit the ready formation of the buffering agent and allow its dispersal into any contaminating aqueous phase. Hence, the buffer may be an essential constituent of the gelling agent or may be added in the form of a finely divided non-colloidal material; as an alcogel, hydrogel or oleogel or even as an aqueous solution. It has been found, for example, that preformed greases of silica and of lime or other polyvalent metal colloid may be mixed in proper proportions so that the final grease contains the critical content of polyvalent metal. The polyvalent metals may be present in the form of silicates, aluminates, oxides, hydroxides, etc., and may be in complex formation with the other gel-forming constituents. The examples which follow are illustrative of the type of greases which may be obtained with these materials.

EXAMPLE VI

Ferric chloride hexahydrate and sodium silicate were mixed with stirring and precipitated by the addition of dilute sodium hydroxide until the aqueous system containing the hydrogel had a pH of 7. The hydrogel was aged for twenty-four hours, washed until chloride-free and then utilized in the formation of a grease by the "direct transfer" process described hereinbefore. The water-repelling agent employed was a condensation product of epichlorohydrin and ammonia in salt form with tall oil. The resulting grease contained 15% solids. The gel contained about 35% $Fe_2O_3$ based on the inorganic constituents. While it is believed that the reaction product was chiefly ferric silicate, it is possible that there were also present both silica and ferric oxide. In preparing the grease, the hydrogel was warmed and mixed with the epichlorohydrin-ammonia condensation product and then was milled in the presence of lubricating oil, after which the mixture was dehydrated by heating for ninety-five minutes at 153° C. The resulting substantially anhydrous composition was milled until a grease-like structure was obtained. The grease so prepared was found to provide satisfactory lubricating properties and did not exhibit any appreciable "dynamic corrosion" characteristics.

EXAMPLE VII

A similar grease was prepared using chromic chloride in place of ferric chloride. The gel, which is believed to be chromic silicate with minor amounts of chromic oxide and silica, contained 34% $Cr_2O_3$. The grease prepared from this gel contained about 15% solids and showed both excellent lubricant characteristics and substantially no "dynamic corrosion."

EXAMPLE VIII

Using the method described in Example VI, a beryllium silicate grease was prepared containing 8.5% solids, the inorganic gel comprising 11.4% beryllium oxide. This grease also showed excellent resistance against the development of "dynamic corrosion."

In the preparation of greases by the "direct transfer" technique, a preferred additional step to those already described comprises an initial colloiding or milling of the hydrogel and oil prior to water removal. The use of this alternative permits much more ready dispersal of the gel throughout the oil with the consequence that the resulting grease is more homogeneous and the maximum thickening properties of the gel may be utilized.

In addition to utilizing buffering agents which comprise an essential component of the inorganic gel, other agents may be employed which in themselves promote the desired buffering action or cause such action to occur by chemical combination of the addition agents with various components of the gelling colloids. For example, gels containing alkaline earth metal compounds may be still further improved by reaction with alkali metal fluorides or alkali metal monohydrogen phosphates. It is believed, although not firmly established, that these two types of addition agents react, for example, with magnesia to form magnesium acid phosphate or magnesium fluoride, which, in turn, perform the desired buffering action. The same effect may be obtained by the use of alkali metal hydroxides or silicates although the former is not one of the preferred concepts of the present invention since these agents are so easily removed by the action of water.

The invention claimed is:

1. A grease composition comprising a major amount of a mineral lubricating oil having dispersed therethrough in colloidally gelled form between about 2% and about 30% based on the weight of the grease of an amorphous silica-lime gel, said gel comprising from about 2% to about 20% by weight of calcium, and from about 5% to about 70% based on the weight of the gel, of a hydrophobic surface active agent absorbed on the surfaces of the gel.

2. A grease composition comprising a major amount of a mineral lubricating oil having dispersed therethrough in colloidally gelled form between about 2% and about 30% based on the weight of said grease of an amorphous silica-magnesia gel, said gel comprising from about 2% to about 20% by weight of magnesium, and from about 5% to about 70% based on the weight of the gel, of a hydrophobic surface active agent absorbed on the surfaces of the gel.

3. A grease composition according to claim 2, having dispersed therethrough a hydrophobic cationic surface-active agent in an amount between about 5% and about 70% by weight of said gel.

4. A grease composition comprising a major amount of a mineral lubricating oil having dispersed therethrough in colloidally gelled form between about 2% and about 30% by weight based on said grease of an amorphous inorganic gel comprising silica as the major component and as the minor component an alkaline earth metal hydroxide, said gel comprising from about 2% to about 20% by weight of alkaline earth metal, and from about 5% to about 70% based on the weight of the gel, of a hydrophobic surface-active agent absorbed on the surface of the gel.

5. A grease composition comprising a major amount of a mineral lubricating oil having dispersed therethrough in colloidally gelled form between about 2% and about 30% based on said grease of an amorphous gel comprising silica as the major component and as the minor component an alkaline earth metal oxide, said gel comprising from about 3% to about 20% by weight of alkaline earth metal, and from about 5% to about 70% based on the weight of the gel, of a hydrophobic surface active agent absorbed on the surfaces of the gel.

6. A lubricating composition comprising a major amount of a lubricating oil having dispersed therethrough in colloidally gelled form from about 4% to about 10% by weight based on said composition, of an amorphous gel comprising silica as the major component and as the minor component an alkaline earth metal oxide, the amount of alkaline earth metal oxide being between about 3% and about 20% by weight of the inorganic constituents of said gel, and from about 5% to about 70% based on the weight of the gel, of a hydrophobic surface active agent absorbed on the surfaces of the gel.

7. A lubricating composition comprising a major amount of a lubricating oil having dispersed therethrough in colloidally gelled form, in an amount sufficient to thicken said oil, an amorphous gel comprising silica as the major component and as the minor component an alkaline earth metal oxide, the amount of alkaline earth metal being between 2% and 25% by weight of the inorganic constituents of said gel, and from about 5% to about 70% based on the weight of the gel, of a hydrophobic surface active agent absorbed on the surfaces of the gel.

8. A lubricating composition comprising a major amount of a lubricating oil having dispersed therethrough in colloidally gelled form in an amount sufficient to thicken said oil, an amorphous gel comprising a mixture of a major component of the group consisting of silica and polyvalent metal silicates and a minor component of the group consisting of polyvalent metal oxides and polyvalent metal hydroxides, the amount of polyvalent metal being between 2% and 25% by weight of the inorganic constituents of said gel, and from about 5% to about 70% based on the weight of the gel, of a hydrophobic surface active agent absorbed on the surfaces of the gel.

FRED H. STROSS.
STANLEY T. ABRAMS.
WALTER H. PETERSON.

References Cited in the file of this patent
UNITED STATES PATENTS

| Number | Name | Date |
|---|---|---|
| 2,531,440 | Jordan | Nov. 28, 1950 |
| 2,554,222 | Stross | May 22, 1951 |
| 2,583,603 | Sirianni et al. | Jan. 29, 1952 |
| 2,583,606 | Sirianni et al. | Jan. 29, 1952 |